(12) United States Patent
Hsieh (10) Patent No.: US 9,869,804 B2
(45) Date of Patent: Jan. 16, 2018

(54) LIGHT-DIFFUSING STRUCTURE

(71) Applicant: Yin-An Hsieh, Taipei (TW)

(72) Inventor: Yin-An Hsieh, Taipei (TW)

( * ) Notice: Subject to any disclaimer, the term of this patent is extended or adjusted under 35 U.S.C. 154(b) by 0 days.

(21) Appl. No.: 14/827,687

(22) Filed: Aug. 17, 2015

(65) Prior Publication Data

US 2016/0053531 A1 Feb. 25, 2016

(30) Foreign Application Priority Data

Aug. 22, 2014 (TW) .............................. 103129021 A (51) Int. Cl.
*G02B 5/02* (2006.01)
*E06B 9/262* (2006.01)

(52) U.S. Cl.
CPC ............ *G02B 5/0278* (2013.01); *E06B 9/262* (2013.01); *E06B 2009/2627* (2013.01)

(58) Field of Classification Search
CPC ....... G02B 5/02–5/0236; G02B 5/0263; G02B 5/0273; G02B 5/0278; E06B 9/262; E06B 2009/2627
See application file for complete search history.

(56) References Cited

U.S. PATENT DOCUMENTS

| 5,701,939 | A | * | 12/1997 | Pinto | ......................... E06B 9/26 160/130 |
| 7,730,925 | B1 | * | 6/2010 | Pereira | .................... E06B 9/262 160/348 |
| 8,256,488 | B2 | * | 9/2012 | Ruggles | .................... E04B 2/74 160/113 |
| 2012/0206923 | A1 | * | 8/2012 | Tanaka | ................ B29C 44/0438 362/326 |

OTHER PUBLICATIONS

Glossary of Drapery Terminology, Neil Gordon, https://www.dwfcontract.com/Drapery--Window-Covering-Blog/bid/34627/Glossary-of-Drapery-Terminology, published online Nov. 27, 2010, accessed Aug. 31, 2016.*

* cited by examiner

*Primary Examiner* — Stephone B Allen
*Assistant Examiner* — Adam W Booher
(74) *Attorney, Agent, or Firm* — Che-Yang Chen; Law Office of Scott Warmuth (57) ABSTRACT

A light-diffusing structure may include a plurality of light-diffusing cell units. Each light-diffusing cell unit is polygonal with a plurality of edges and corners respectively, and the light-diffusing cell units connect with others by the edges to form a light-diffusing panel. When the sunlight passes through the light-diffusing panel, the sunlight is diffused and converted to a uniformly balanced light source. The light-diffusing structure may further include a restricting unit to restrict the movement of the light-diffusing panel.

10 Claims, 10 Drawing Sheets

LIGHT-DIFFUSING STRUCTURE

FIELD OF THE INVENTION

The present invention relates to a light-diffusing structure, and more particularly to a light-diffusing structure used for windows to diffuse and convert the sunlight to a uniformly balanced light source.

BACKGROUND OF THE INVENTION

A conventional window glass is used for the light to pass through, so the sunlight can pass through the window glass to reach the interior space of a house. In other words, the sunlight is introduced into the interior of the building by the window glass. However, the direction of the light into the space usually depends on the angle of the sunlight. Therefore, the light may unevenly focus on certain areas of the building, and a glare may be generated as a result.

To solve the problem of glare, blinds or shades are usually used. However, when blinds or shades are applied, the interior space no longer receives enough natural light, and an artificial light may be needed.

Although a light-diffusing window glass has been developed to resolve the problem stated above, it is very expensive and every piece of glass on the window needs to be replaced. In addition, the light-diffusing glass is not transparent, so it is difficult for people to see outside from the glass. Moreover, this kind of light-diffusing glass has to be made by a double-layered glass with light-diffusing material inside. Therefore, there remains a need for a new and improved light-diffusing glass to overcome the problems stated above.

SUMMARY OF THE INVENTION

To overcome the problems stated above, the present invention provides a retractable light-diffusing structure that can not only diffuse but also redirect the light.

In one aspect, the light-diffusing structure in the present invention includes a plurality of cell units. Each cell unit is in a polygon shape that has a plurality of corners and edges. The cell units are connected with each other at the edges to form the light-diffusing structure. When the sunlight goes through the light-diffusing structure, it can be more evenly distributed to cover all interior space of the building.

The present invention is advantageous because the light-diffusing structure can be installed on the window, without changing the window frame or replacing the window glasses. Also, it can be restored so the user can still enjoy the window view, or expanded out to diffuse the sunlight. With the light-diffusing structure, the light can be uniformly and evenly delivered into the interior space. Glare can also be eliminated by the diffusing structure to prevent uneven brightness in the interior space, on computer monitors or other reading materials. It is noted that because of the design of the light-diffusing structure, even though the sunlight angle is changing, the glare can be eliminated automatically. Artificial light usage can be also reduced when the light-diffusing structure is applied on the window, and when artificial light usage is reduced, the temperature of the interior space can also be reduced to further reduce the use of air conditioning. The light-diffusing structure can provide good heat insulation by removing direct sunlight, and it is considered a good thermo barrier because of the materials used for the structure and the air space therein. The light-diffusing structure can also be used for noise reduction and enhancing the user's privacy when it is expanded.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
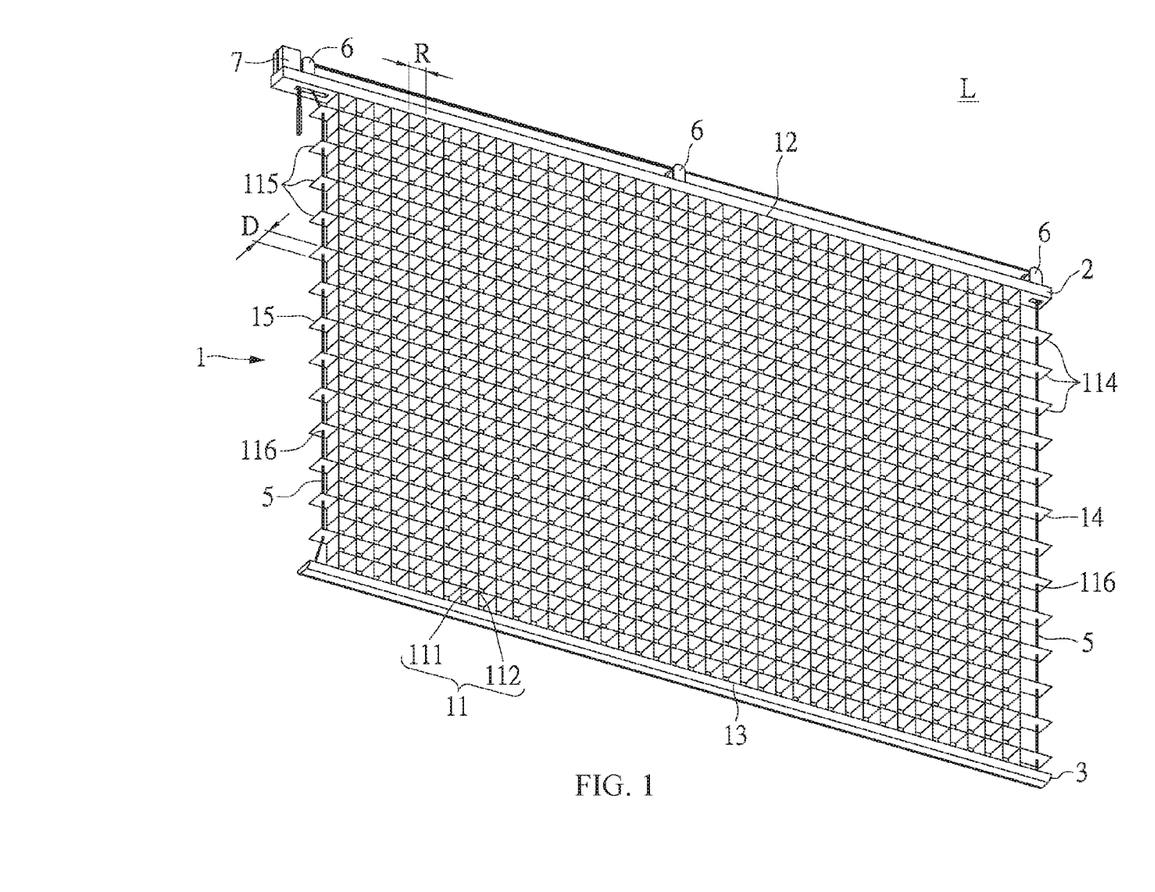
FIG. 1 is a three-dimensional view of the first embodiment in the present invention

In a first aspect, as shown in FIG. 1, a light-diffusing structure may include a light-diffusing structure L, which has a plurality of light-diffusing cell units 11. Every cell unit 11 is in a polygon shape with several edges 111 and corners 112 corresponding to the edges 111. Each light-diffusing cell unit 11 is connected to each other by the edges 111 to form a light-diffusing panel 1. In one embodiment, the polygon can be, but not limited to triangle, rectangular, hexagon, or other polygonal shapes. The light-diffusing structure L can be disposed on a window, and when the sunlight passes through light-diffusing panel 1, the sunlight is diffused to be a uniformly balanced light source for the interior space. In another embodiment, the area of each cell unit can be, but not limited to, 0.75 to 1.5 mm$^2$ to increase the contacting area between the sunlight and light-diffusing panel 1. These small and dense light-diffusing cell units 11 can enhance the effect of light diffusing, balancing, and delivering. In a further embodiment, the material of light-diffusing cell units 11 can be, but not limited to, plastic tape film, acrylic (Polymethylmethacrylate, PMMA) that is good for light penetration, refraction, or reflection. The material can also be a parafilm that is good for light penetration, light refraction, folding and bending. This light penetration, light refraction, light reflection, and foldable material may include Polypropylene (PP), Polyethylene (PE), Poly Vinyl Chloride (PVC), Polyester, Polyethylene terephthalate (PET), or Polyimide (PI).

In addition, as shown in FIG. 1, the light-diffusing panel 1 may include a first boundary 12, a second boundary 13, a third boundary 14 and a fourth boundary 15. The first boundary 12 and the second boundary 13 are facing each other, while the third boundary 14 and the fourth boundary 15 are facing each other as well. A first rail 2 is attached to the first boundary 12, and a second rail 3 is attached to the second boundary 13. Thus, when the first rail 2 and second rail 3 are moved toward each other, every light-diffusing cell unit 11 can be compressed by the change of the angles of corners 112, and the size of light-diffusing panel 1 can be significantly reduced. On the other hand, when the first rail 2 and second rail 3 are moved away from each other, the light-diffusing cell units 11 can be opened up, and the light-diffusing panel 1 can be expanded.

In order to keep every light-diffusing cell units 11 to stay at a desired position when the first rail 2 and second rail 3 are moving, a restricting unit 5 is provided to limit the movement of the light-diffusing cell units 11. The restricting unit 5 can be, but not limited to, a cord or a string. In one embodiment, the restricting unit 5 can be installed at the third boundary 14 or the fourth boundary 15 to limit the movement of the light-diffusing cell units 11. Thus, when light-diffusing panel 1 is expanded, every light-diffusing cell unit can be opened to its maximum size. Furthermore, when the first rail 2 and second rail 3 are moving, the restricting unit 5 can prevent the light-diffusing cell units 11 from being tangled with each other. As stated above, the restricting unit 5 can be installed at either the third boundary 14 or the fourth boundary 15. One end of the restricting unit 5 can be attached to the second rail 3, and the other end thereof can go around roller wheels 6 on the first rail 2 to allow an end user to control the restricting unit 5. In another embodiment, on the light-diffusing panel 1, each odd edge 114 of the edges 111 on the light-diffusing cell units 11 at the third boundary 14 has a hole 116 to allow the restricting unit 5 at the third boundary 14 to pass through. Likewise, each even edge 115 of the edges 111 on the light-diffusing cell units 11 at the fourth boundary 15 has a hole 116 to allow the restricting unit 5 at the fourth boundary 15 to pass through. Thus, an end user can pull up the second rail 3 by pulling the restricting unit 5, and the restricting unit 5 can limit the movement of the diffusing cell units 11 simultaneously while the second rail 3 is moving up. Similarly, when the restricting unit 5 is released, the movement of the light-diffusing cell units 11 can be restricted by the restricting unit 5 as well as the weight of the second rail 3.

Referring again to FIG. 1, every light-diffusing cell units 11 has a predetermined diameter R and a depth D. For example, when the edges 111 of the polygon of the light-diffusing cell units 11 is triangle, quadrangle, hexagon, or any other polygon, the diameter R is the diameter of the internal adjacent circle. The depth D is the depth of the light-diffusing cell units 11. In another word, the depth D is the distance that the sunlight can pass through the light-diffusing cell units 11. In addition, when the ratio between the diameter R and the depth D is in the range between 3:8 to 1:4, the light-diffusing panel 1 can effectively remove the sun glare, and provide sufficient light source converted from the sunlight. Even when the sunlight comes from a very low angle position, e.g. the ratio of 1:4 (diameter R: depth D), the sun glare can still be removed. Moreover, it is noted that no matter how the angle of the sunlight is changing, the glare can be automatically eliminated by the light-diffusing structure L.

The light-diffusing structure L in the first aspect is retractable, and can be installed at the front side of a window. It is configured to diffuse and direct the sunlight into the interior space evenly by the light-diffusing cell units 11 of the light-diffusing panel 1.

Figure 2:
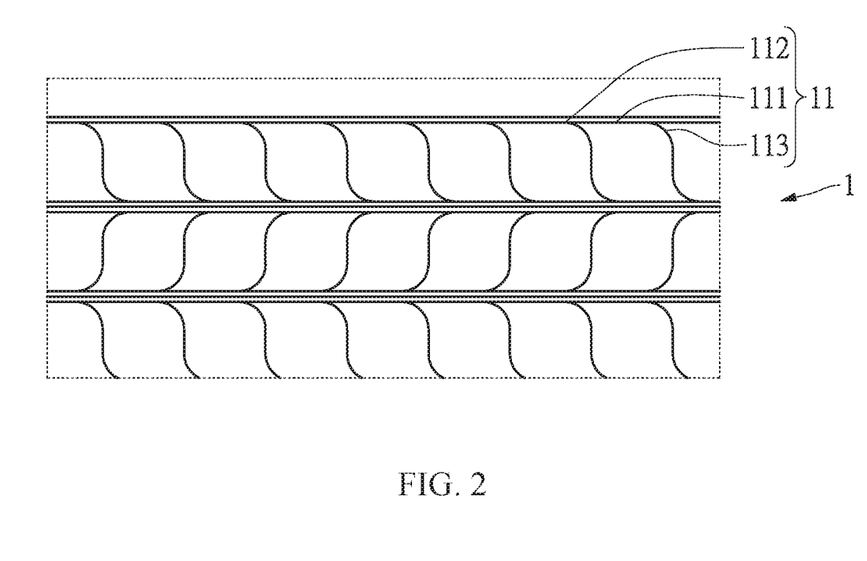
FIG. 2 is the enlarged partial front view of the second embodiment of the present invention.

In the second aspect, as shown in FIGS. 2, 3A, 3B, and 3C, each light-diffusing cell units 11 is shaped in a substantially rectangular manner with four curved corner. More specifically, as shown in FIG. 2, the light-diffusing structure may include a light-diffusing structure L with a plurality of light-diffusing cell units 11. Each of these light-diffusing cell units 11 is shaped in a substantially rectangular manner with four edges 111 and four corners 112, and each light-diffusing cell units 11 is configured to connect with each other by its four edges 111 to form a light-diffusing panel 1. Moreover, each edge 111 has a curvature 113, so the light-diffusing panel 1 can be restored or expanded along the curvature 113.

Figure 3A:
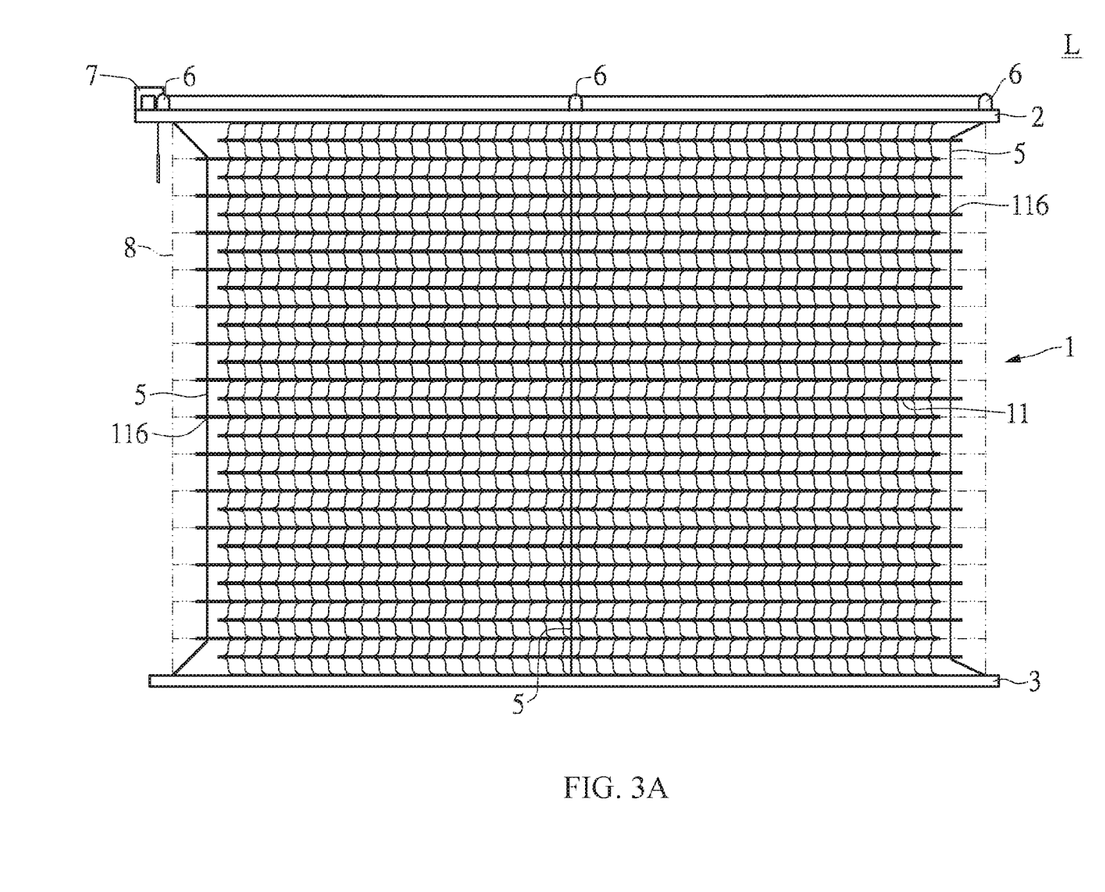
FIG. 3A is the front view of the second embodiment of the present invention when in use.
Figure 3B:
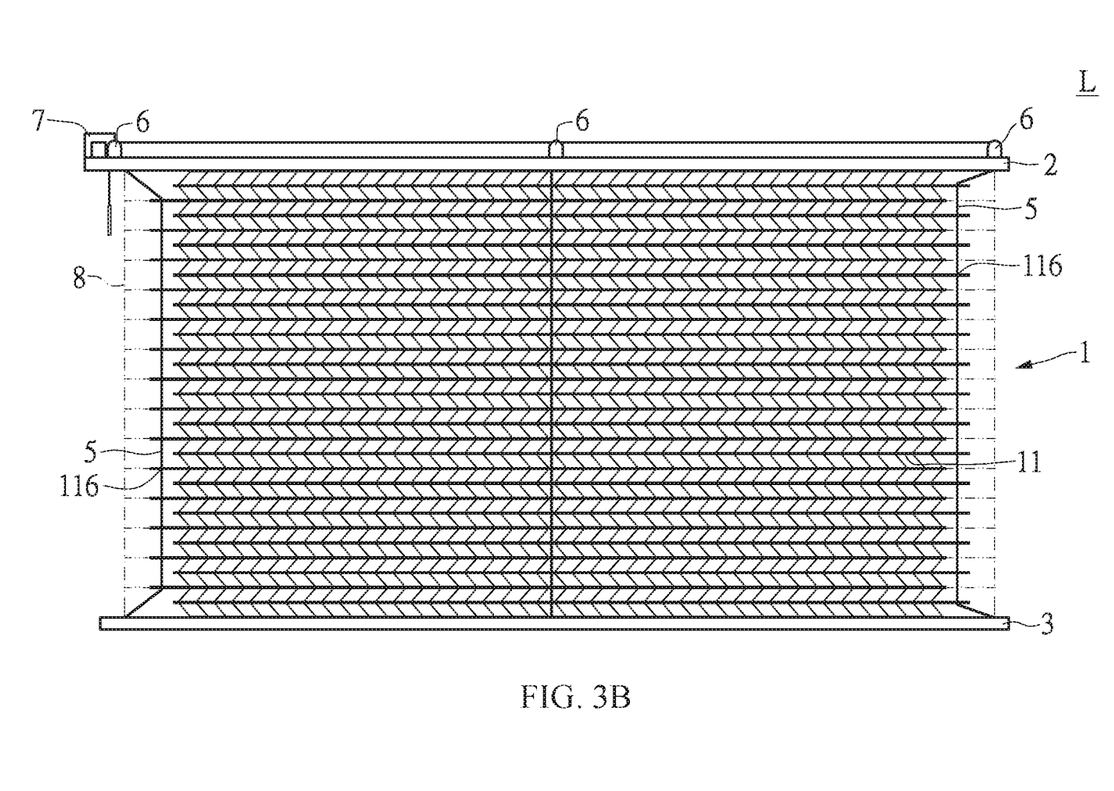
FIG. 3B is the front view of the second embodiment at another status of use of the present invention.
Figure 3C:
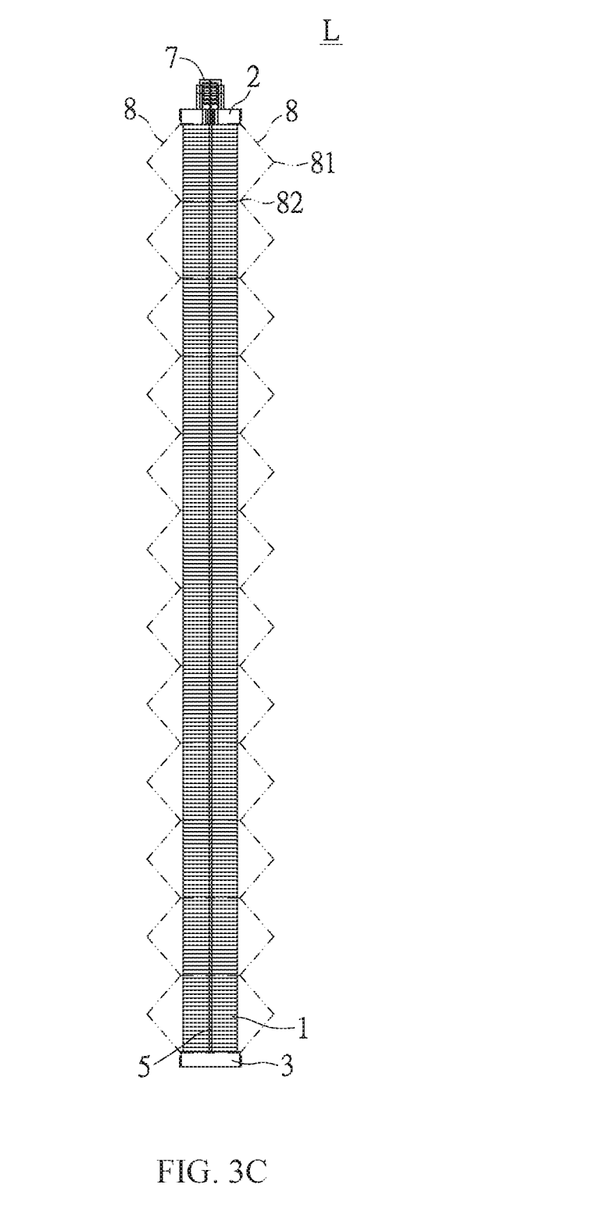
FIG. 3C is the lateral view of the second embodiment of the present invention when in use.

Furthermore, as shown in FIGS. 3A and 3B, each light-diffusing cell units 11 is in a substantially rectangular shape and the each of the four corners 112 has the curvature 113, so it is easier and smoother for the light-diffusing panel 1 to be restored or expanded along the curvature 113, and to further avoid the problem of breaking the light-diffusing cell units 11 during the folding processes. The light-diffusing panel 1 can be placed between the first rail 2 and second rail 3. In one embodiment, the first rail 2 can be equipped with some parts similar to typical blinds, such as roller wheels 6, a clutch 7, and the restricting unit 5. The restricting unit 5 can be placed at the third boundary 14 and the fourth boundary 15. Moreover, a translucent veil 8 can also be attached to the light-diffusing structure L not only to enhance the effect of light-diffusing and balancing, but also to prevent dirt from getting into cell units 11. For example, a top edge of the translucent veil 8 can be attached to the first rail 2, and the bottom edge thereof can be attached to the second rail 3. Thus, as shown in FIGS. 3B and 3C, when an end user operates the restricting unit 5 to restore or expand light-diffusing panel 1, the translucent veil 8 can also be restored or expanded simultaneously. However, the placement of translucent veils 8 is an option for better effect of light-diffusing and balancing, not a necessary portion for this invention. The translucent veil 8 can be restored or expanded in the zigzag way as shown in FIGS. 3B and 3C. In another embodiment, the translucent veil 8 can be restored or expanded in a way like a roller shade.

Figure 6A:
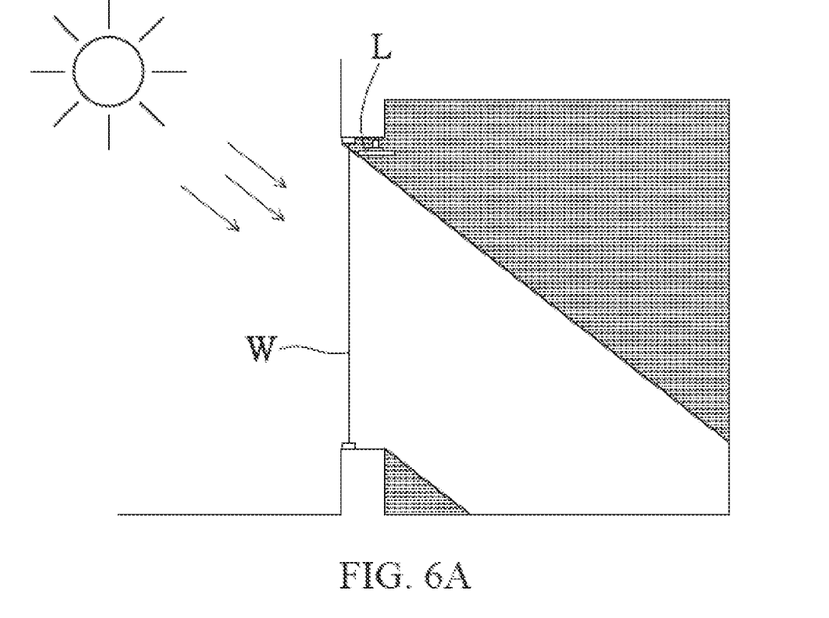
FIG. 6A is a schematic view of one embodiment of the present invention when the light-diffusing structure is restored.
Figure 6B:
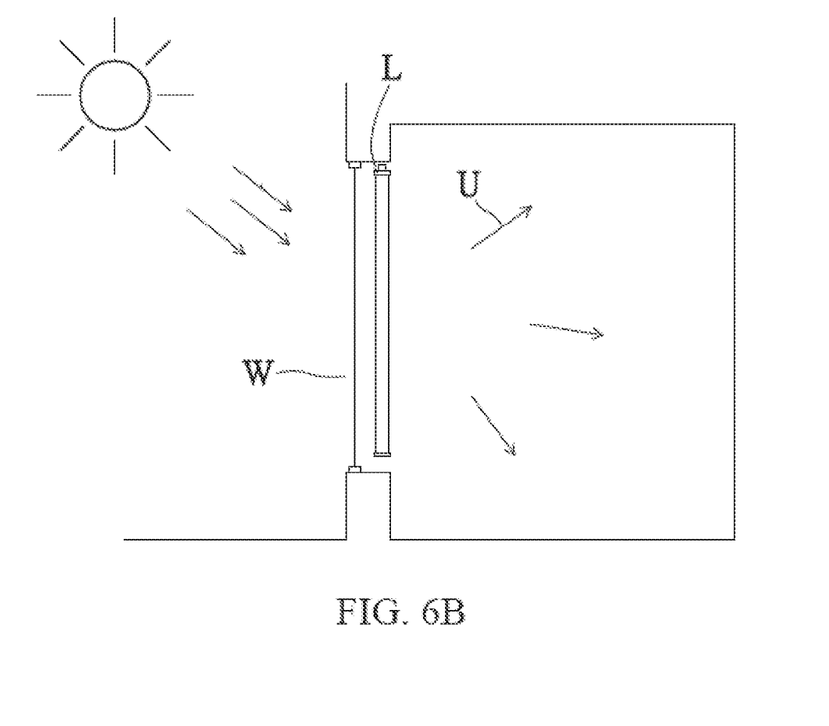
FIG. 6B is a schematic view of one embodiment of the present invention when the structure is expanded.

Referring to FIGS. 6A and 6B, the light-diffusing structure L is disposed at the interior side of the window W. When the light-diffusing structure L is restored, the sunlight goes through the window directly without changing its direction, so the interior space that receives direct sunlight becomes very bright and hot. Namely, the sunlight cannot be equally diffused through the window W. When the light-diffusing structure L is applied and expanded, the sunlight has to pass through the light-diffusing structure L after passing through the window W, and will be diffused to become a uniform light source U. Thus, the interior space can receive a more even and balanced natural light.

In summary, with the light-diffusing cell units 11 of light-diffusing panel 1 and the translucent veil 8, the light-diffusing structure L in the second aspect can convert direct sunlight into a more diffused and balanced light source, and evenly delivers it to the interior space. Meanwhile, the light-diffusing structure L has some components that are similar to typical blinds to restore and expand the light-diffusing structure L.

Figure 4:
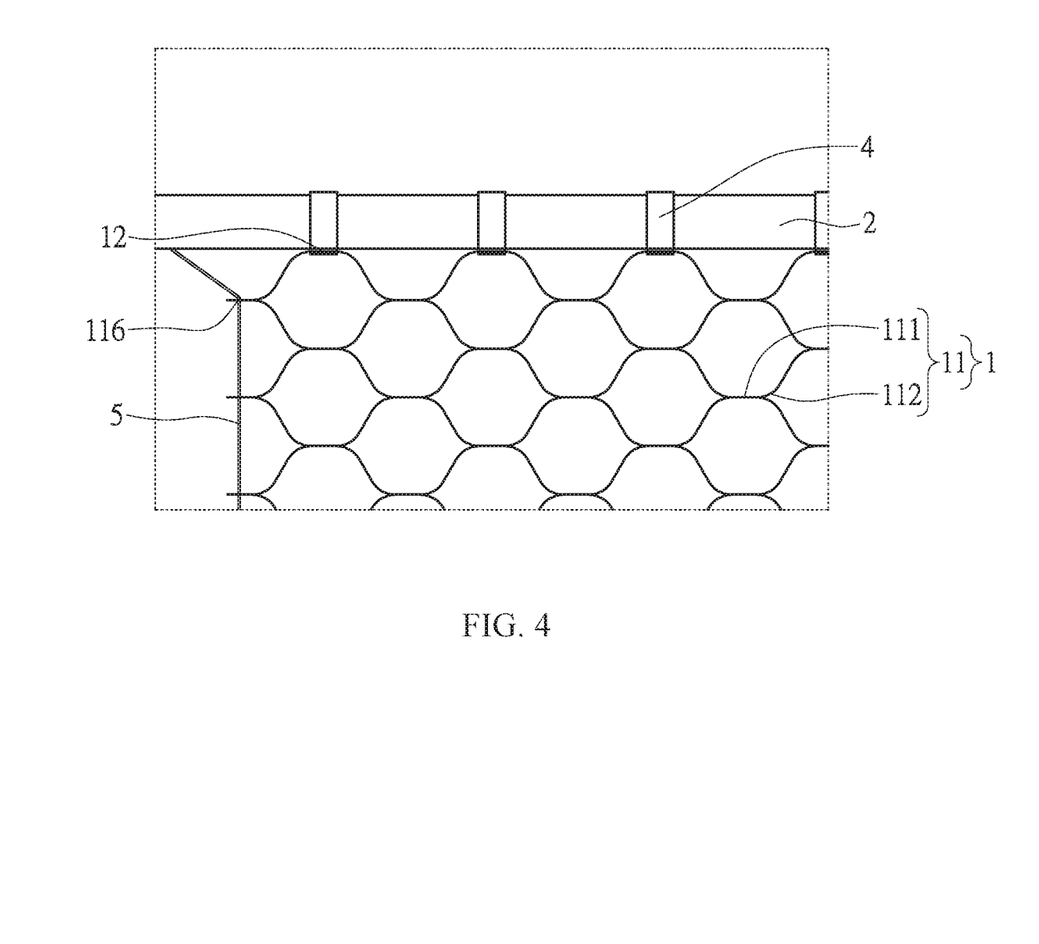
FIG. 4 is the enlarged partial front view of the third embodiment of the present invention.
Figure 5:
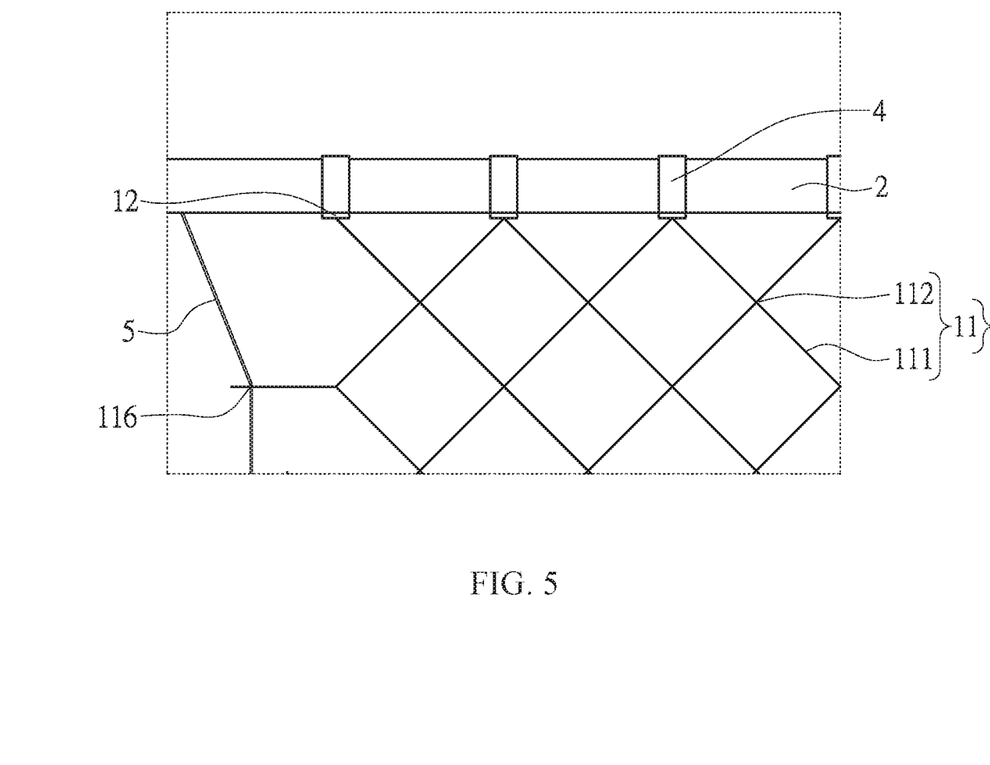
FIG. 5 is another enlarged partial front view of the third embodiment of the present invention.

In a third aspect, referring to FIGS. 4 and 5, the shape of each light-diffusing cell units 11 is hexagonal or diamond-shaped, which is different from the second aspect in which the cell units are rectangular. Also, the light-diffusing structure L further includes a plurality of ring sleeves 4. It is noted that the hexagonal or diamond-shaped cell units 11 may cause significant shrinking of the width of the light-diffusing panel 1 while the first rail 2 and second rail 3 are moving away from each other, and ring sleeves 4 are added to mitigate the shrinking effect. In one embodiment, the ring sleeves 4 can be put around a lower portion of the first rail 2 to allow the ring sleeves 4 to move freely on the first rail 2. As shown in FIGS. 1 and 4, the light-diffusing structure L includes a plurality of light-diffusing cell units 11, a first rail 2, a second rail 3, and a plurality of ring sleeves 4. Each of these light-diffusing cell units 11 is in a substantially hexagonal shape with six edges 111 and six corners 112 respectively, and each light-diffusing cell units 11 can be connected to other units by the edge 111 to form the light-diffusing panel 1.

Referring to FIGS. 1 and 4, the first rail 2 can be disposed on the first boundary 12 of light-diffusing panel 1, and the second rail 3 can be disposed on the second boundary 13 thereof. A plurality of ring sleeves 4 are installed surrounding the first rail 2 and second rail 3. Each ring sleeve 4 is also connected to the edges 111 of light-diffusing cell units 11 at first boundary 12 and second boundary 13. Thus, through the connection to the ring sleeves 4, the light-diffusing panel 1 can move freely on the first rail 2 and second rail 3. In one embodiment, the first rail 2 can be separated into two rails to allow ring sleeves 4 to move (shift) freely on it. Likewise, the second rail 3 can also be separated into two rails to allow ring sleeves 4 to move (shift) freely on it. In addition, the light-diffusing structure L can also be equipped with the restricting unit 5 at the third boundary 14 or the fourth boundary 15 to limit the movement of the light-diffusing panel 1. Thus, during the movement, each light-diffusing cell units 11 can still maintain its opening to a maximized extent, and will not shift to the wrong direction, nor twist untidily. In one embodiment, the restricting unit 5 is located at either the third boundary 14, fourth boundary 15, or the center of the light-diffusing panel 1. One end of each restricting unit 5 can be attached to the second rail 3, and the other side of the restricting unit 5 can go around the roller wheels 6 on the first rail 2 to allow an end user to control the restricting units 5. Moreover, on the light-diffusing panel 1, each edge 111 at the third boundary 14, fourth boundary 15, and the center of light-diffusing panel 1 has a hole 116 to allow the restricting unit 5 to pass through. Thus, by using the ring sleeves 4 and restricting units 5, the hexagonal light-diffusing cell units 11 will not twist untidily when light-diffusing panel 1 is restoring or expanding. Moreover, in another embodiment, the translucent veils 8 can also be attached to the light-diffusing structure L to enhance the effect of light diffusing and balancing.

As shown in FIG. 5, every light-diffusing cell units 11 is diamond-shaped with four edges 111 and four corners 112 respectively. Every light-diffusing cell units 11 is connected to each other by the edge 111 to form the light-diffusing panel 1. Meanwhile, the first rail 2 is disposed on the first boundary 12 of the light-diffusing panel 1, while the second rail 3 is disposed on the second boundary 13 thereof. A plurality of ring sleeves 4 are disposed surrounding the first rail 2 and second rail 3. Each ring sleeve 4 is also connected to the light-diffusing cell units 11 at the first boundary 12 and the second boundary 13. Thus, when the first rail 2 and the second rail 3 are moving toward to each other, the diamond-shaped light-diffusing cell units 11 are squeezed and piled up to each other in order, and the light-diffusing panel 1 can be restored. The light-diffusing panel 1 can also shift (move) freely on the first rail 2 and second rail 3 by connecting to the first rail 2 and second rail 3 through the ring sleeves 4.

In summary, the light-diffusing structure L in the third aspect can be installed in front of the window, and can be easily restored or expanded by an end user. The light-diffusing cell units 11 and the translucent veil 8 on light-diffusing structure L diffuse the sunlight coming from outside, and deliver it into the interior space evenly. Meanwhile, by using the ring sleeves 4 and restricting unit 5, the light-diffusing panel 1 can move freely on the first rail 2 and second rail 3.

Figure 7:
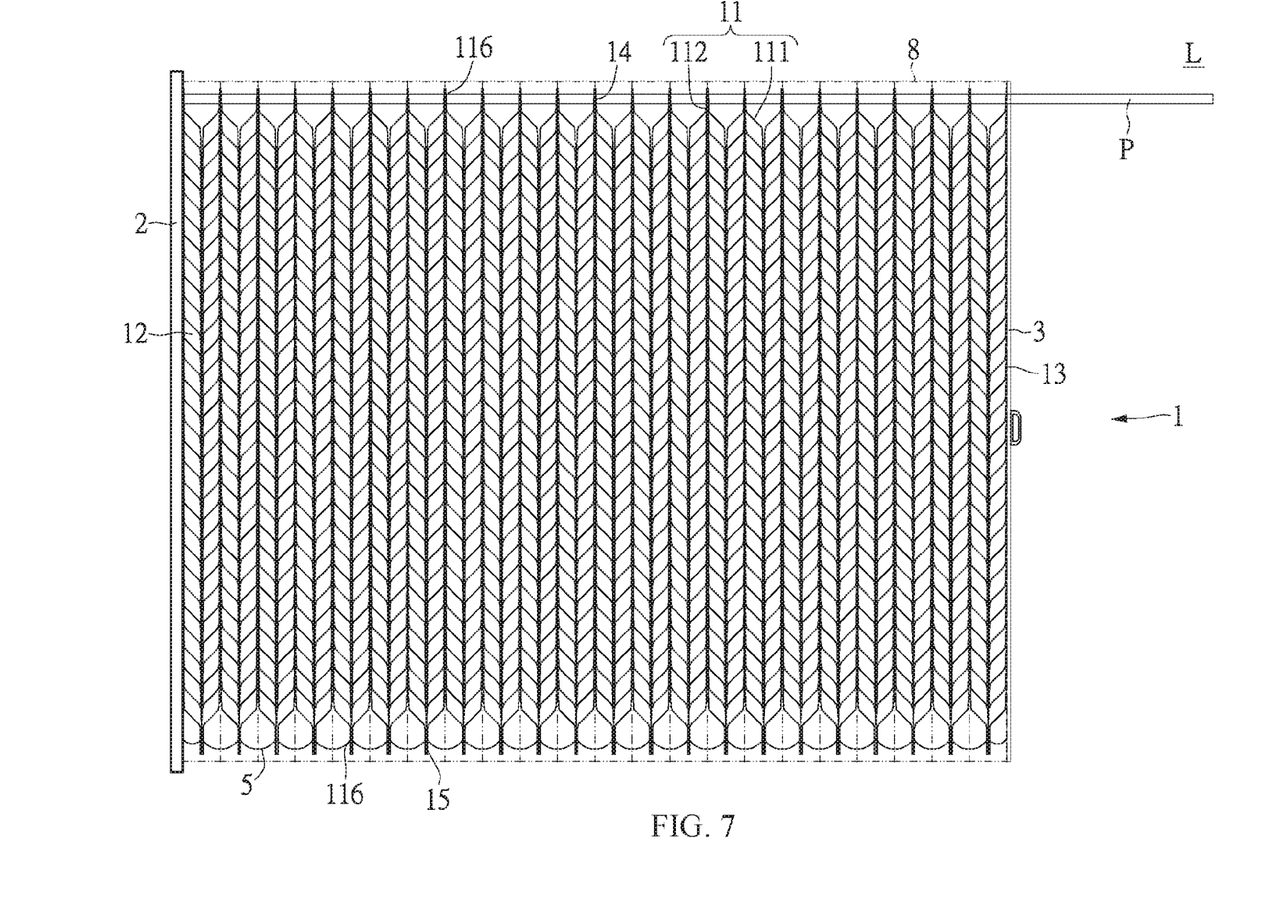
FIG. 7 is a schematic view of a fourth embodiment of the present invention when in use.

In a fourth aspect, as shown in FIG. 7, a vertical light-diffusing structure is disclosed. Likewise, the light-diffusing structure L includes a plurality of light-diffusing cell units 11, a first rail 2, a second rail 3, a restricting unit 5, a supporting unit P, and translucent veils 8. With the support provided by the supporting unit P, the light-diffusing structure L can be hung in front of the window W, and delivers natural sunlight into the interior space evenly.

More specifically, every light-diffusing cell units 11 in the fourth aspect has four edges 111 and four corresponding curved corners 112. Every light-diffusing cell units 11 connect to each other by the edges 111 to form the light-diffusing panel 1. The light-diffusing panel 1 has the first boundary 12, second boundary 13, third boundary 14, and fourth boundary 15. The light-diffusing structure L also has a first rail 2 located on the first boundary 12, and a second rail 3 located on the second boundary 13. The restricting unit 5 can be disposed at the fourth boundary 15, but it is optional. The supporting unit P can also be dispose on the third boundary 14 to hang the light-diffusing panel 1. In one embodiment, the supporting unit P can connect to the light-diffusing panel 1 at the third boundary 14. Two opposite sides of the translucent veil 8 can be attached on the first rail 2 and the second rail 3. There are several folding lines 81 and connecting points 82 on the translucent veil 8, and the connecting points 82 can connect to every other edges 111 of light-diffusing panel 1. The folding line 81 can be disposed between two connecting points 82. Thus, the translucent veil 8 can be restored or expanded along with the light-diffusing structure L.

Like the aspects described above, the fourth aspect of the present invention provides a light-diffusing structure L, which can be installed on the window, and can be restored or expanded. The light-diffusing cell units 11 of light-diffusing panel 1 and the translucent veil 8 on the light-diffusing structure L can diffuse the sunlight from outside, and evenly deliver it into the interior space. Meanwhile, the light-diffusing structure L, can be hung up in front of the window W through the support provided by the supporting unit P.

Figure 8:
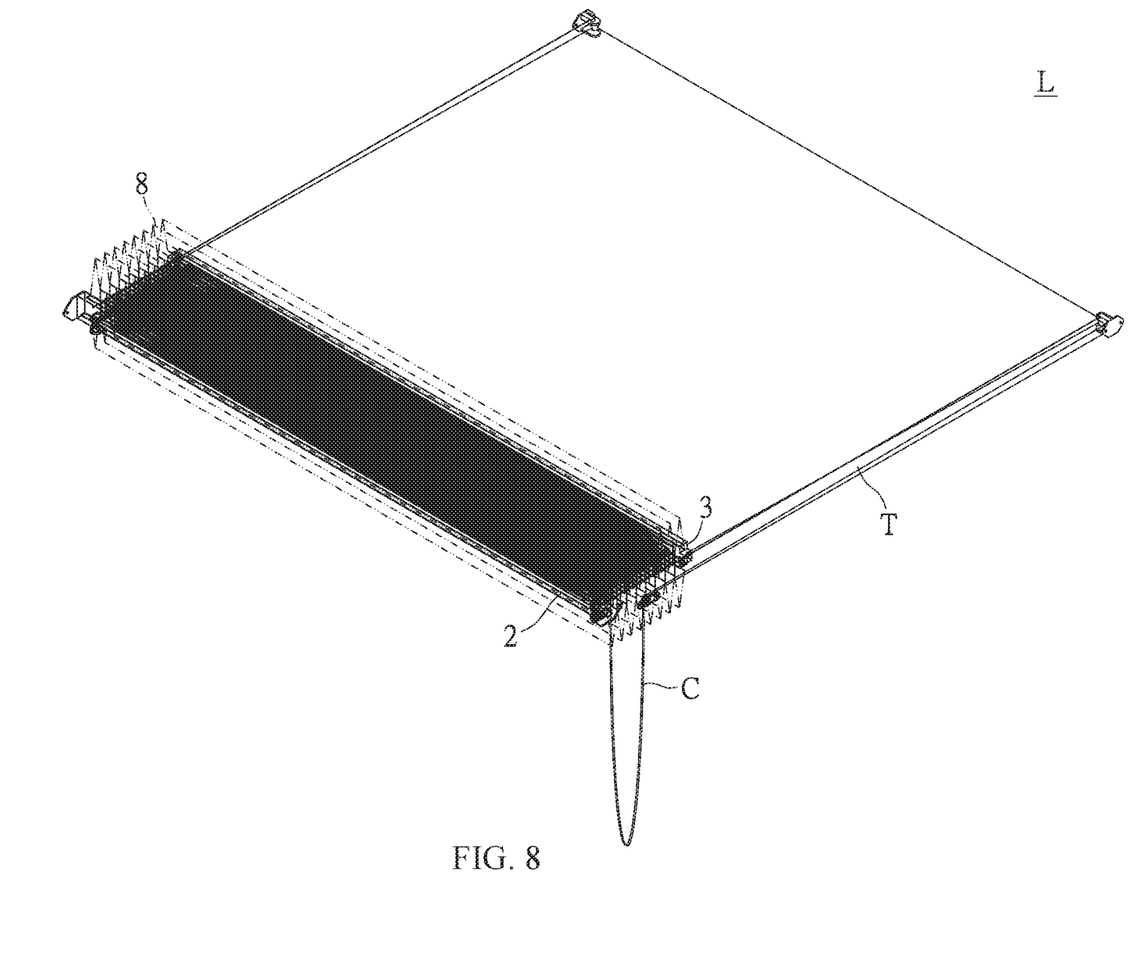
FIG. 8 is a schematic view of a fifth embodiment of the present invention when in use.

FIG. 8 illustrates a fifth aspect of the present invention. The difference between the fifth aspect and the first aspect is that the first aspect is a substantially horizontal light-diffusing structure, while the fifth aspect is a light-diffusing structure for skylight at a roof ceiling. As shown in FIG. 8, the fifth aspect of the present invention includes a light-diffusing structure L, which has a plurality of light-diffusing cell units 11, a first rail 2, a second rail 3, a restricting unit 5, translucent veils 8, and a pair of track units T.

FIG. 8 shows a restored light-diffusing structure L. Like the light-diffusing structure discussed above, every light-diffusing cell units 11 has a plurality of edges 111 and curved corners 112 respectively. Every light-diffusing cell units 11 connect to each other by the edges 111 to form the light-diffusing panel 1. The light-diffusing panel 1 has the first boundary 12, second boundary 13, third boundary 14, and fourth boundary 15. The first rail 2 is located on the first boundary 12, while the second rail 3 is located on the second boundary 13. The restricting unit 5 can be installed at the third boundary 14 and fourth boundary 15 to control the movement of light-diffusing cell units 11 on light-diffusing panel 1. Two opposite sides of the translucent veil 8 can be attached on the first rail 2 and the second rail 3. In one embodiment, the track unit T can be soft cables (cords) or solid track. In terms of solid track, a sliding block can be disposed at both ends of the second rail 3 to allow the second rail 3 moving along track units T. In terms of soft cables (cords), an end user can use a control cord C to restore or expand the light-diffusing structure L.

The light-diffusing structure L in the fifth aspect in the present invention can be installed on a window, and can be restored or expanded. The light-diffusing cell units 11 of the light-diffusing panel 1 and the translucent veil 8 on light-diffusing structure L diffuse sunlight from outside, and deliver it into the interior space evenly. Meanwhile, the track unit T enables the light-diffusing structure L to be installed on the skylight window of the roof ceiling.

To sum up, the present invention is advantageous because the light-diffusing structure can be installed on the window, without changing the window frame or replacing the window glasses. Also, it can be restored so the user can still enjoy the window view, or expanded out to diffuse the sunlight. With the light-diffusing structure, the light can be uniformly and evenly delivered into the interior space with various shapes of the light diffusing cell units 11 and translucent veils 8.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A light-diffusing structure comprising a plurality of continuous and hollow light-diffusing cell units, each light-diffusing cell unit is polygonal having a through opening including a light-receiving end and a light-diffusing end with a plurality of edges and corners respectively, and said light-diffusing cell units connecting with others by the edges to form a light-diffusing panel, wherein a hollow space is created between said light-receiving end and light-diffusing end, and when sunlight passes through said hollow space from the light-receiving end and exits from the light-diffusing end, the sunlight is diffused and converted to a uniformly balanced light source, wherein said light-diffusing panel has a first boundary, a second boundary, a third boundary and a fourth boundary, and the first boundary is located at an opposite side of the second boundary, while the third boundary is located at an opposite side of the fourth boundary, and a restricting unit disposed on either the third boundary or the fourth boundary to restrict movement of the light-diffusing panel, wherein each of odd-numbered edges on the light-diffusing cell units at the third boundary has a first hole to allow the restricting unit at the third boundary to pass through, and each of even-numbered edges on the light-diffusing cell units at the fourth boundary has a second hole to allow the restricting unit at the fourth boundary to pass through.

2. The light-diffusing structure of claim 1, further comprising a first rail and a second rail; said first rail and second rail disposed at the first boundary and second boundary respectively.

3. The light-diffusing structure of claim 2, wherein the first rail and the second rail are configured to move away from each other to open up the light-diffusing panel.

4. The light-diffusing structure of claim 2, wherein the first rail and the second rail are configured to move toward each other to restore the light-diffusing panel.

5. The light-diffusing structure of claim 2, wherein each light-diffusing cell unit is configured to be folded and piled up when the light-diffusing panel is restored.

6. The light-diffusing structure of claim 2, further comprising a plurality of ring sleeves located surrounding the first rail and second rail; each ring sleeve connecting to the edges of light-diffusing cell units at the first boundary and second boundary, so the light-diffusing panel is able to move freely on the first rail and second rail.

7. The light-diffusing structure of claim 1, wherein a curvature is formed on the corners of each light-diffusing cell unit to enable the light-diffusing panel to be restored and expanded.

8. The light-diffusing structure of claim 1, wherein the light-diffusing cell unit is either rectangular-shaped, hexagonal-shaped, or diamond-shaped.

9. The light-diffusing structure of claim 1, wherein the light-diffusing cell units are made by a material selected from Polypropylene (PP), polyethylene (PE), Poly Vinyl Chloride (PVC), Polyester, Polyethylene terephthalate (PET), Polyimide (PI), or Polymethylmethacrylate (PMMA).

10. The light-diffusing structure of claim 1, wherein the light-diffusing cell units are made by soft materials.

\* \* \* \* \*